Aug. 7, 1951    H. G. HAGER    2,563,465
APPARATUS FOR ARRANGING LOOPED ARTICLES
Filed Feb. 3, 1949
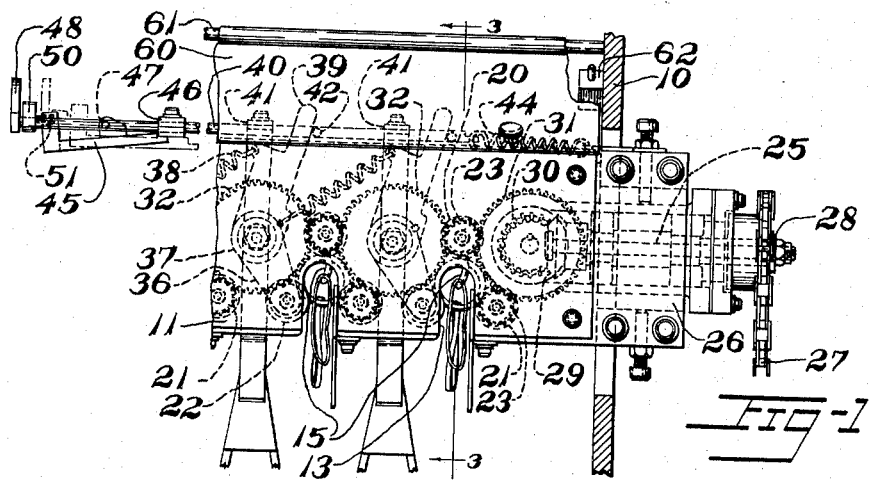
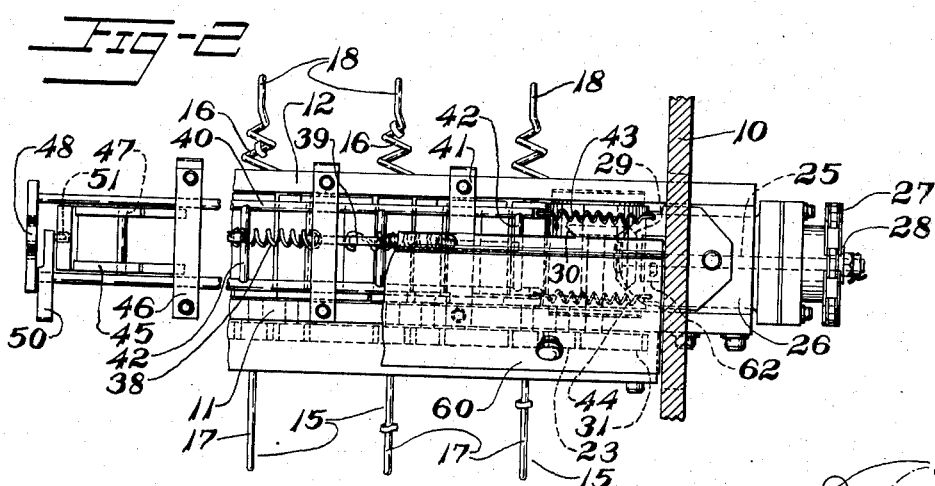
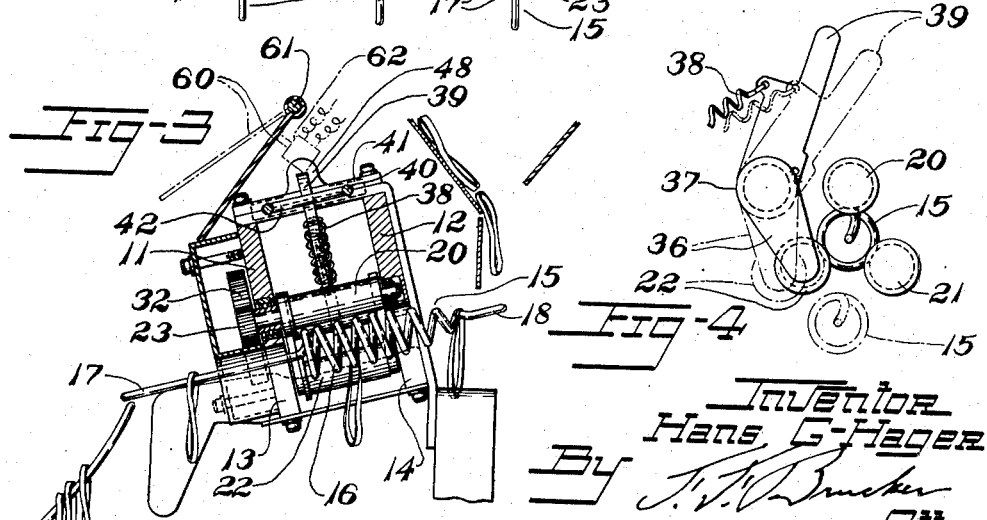
Inventor
Hans G. Hager Patented Aug. 7, 1951

2,563,465

UNITED STATES PATENT OFFICE 2,563,465

APPARATUS FOR ARRANGING LOOPED ARTICLES

Hans G. Hager, Akron, Ohio, assignor to The B. F. Goodrich Company, New York, N. Y., a corporation of New York Application February 3, 1949, Serial No. 74,375

5 Claims. (Cl. 214—1)

This invention relates to apparatus for arranging looped articles and is especially useful in arranging rubber bands or similar articles in orderly groups of predetermined size. The invention is an improvement on the apparatus of the Charles C. Cadden Patents Nos. 1,578,392 and 1,578,393.

Apparatus constructed in accordance with the Cadden patents has been found very successful in the sorting and grouping of elastic rubber bands. Certain difficulties have, however, been experienced in the use of such apparatus. In the construction of those machines, the conveyor screws, designated by the numeral 38 in the Cadden patents, were each cradled between three spools or rollers 39 whereby they were rotated. As the rollers 39 were on fixed axes, it was necessary that the conveyor screws 38, which were coiled from spring wire, be very accurate in dimensions. It was found extremely difficult to provide screws of the desired accuracy and to maintain their dimensions in use. Out of a large quantity of such screws, it was found necessary to discard a great many screws out of each quantity received from the maker.

It is an object of the present invention to provide for use of feed screws of a range of diameters.

Other objects are to provide for quick removal and replacement of the feed screws, to provide means for releasing tension of the guide rollers against the feed screws, and to provide against starting of the machine when replacement of feed screws is being undertaken.

These and other objects will appear from the following description and the accompanying drawings.

Of the drawings,

Fig. 1 is a front view of that part of the apparatus which includes the feed screws and their supporting and driving mechanism, parts being broken away, Fig. 2 is a plan view thereof, Fig. 3 is a sectional view taken on line 3—3 of Fig. 1, and Fig. 4 is a detail view thereof.

Referring to the drawings, the numeral 10 designates one of the side frame members of the apparatus which supports a pair of parallel cross plates 11, 12 which extend across the delivery side of the machine from one side frame member to another and are inclined to the vertical. The cross plates 11, 12 are formed with notches 13, 14 at intervals to clear the feed screws 15. Each feed screw 15 has a central screw portion 16 having at least one tapered shoulder and axially extending terminal portions 17, 18.

Each feed screw 15 is supported between two fixed rolls 20, 21 and a movable roll 22. All of these rolls are shrouded to retain the feed screw and have gears 23 integral therewith for driving them. The rolls are mounted in bearings supported by cross plates 11, 12.

For driving the rollers a shaft 25 is journaled in a bearing 26 or frame member 10 and is driven from any convenient source by a chain 27 and sprocket 28. The shaft has a bevel gear 29 fixed thereto which meshes with a similar bevel gear 30. Gear 30 is integral with a gear 31 which meshes with gear 23. Idler gears 32 similar to gear 31 are rotatably mounted between the feed stations and with the gears 31 complete a train of gears for driving all the feed screw supporting rolls.

The movable rollers 22 are each rotatably mounted upon levers 36 which have pivot bearings 37 coaxial with the gears 32 with which they constantly mesh. The arrangement is such that the rollers 22 are driven in any position they assume. Each lever 36 is urged in a counter-clockwise direction as seen in Figs. 2 and 4 by a tension coil spring 38, one end of which is secured to the lever and the other end of which is secured to the cross plates 11, 12. The arrangement is such that the roller 22 presses against the feed screw 15 at all times and the feed screws may vary in diameter.

For manipulating the levers 36 when it is desired to release the feed screws each lever has an upstanding handle 39. These handles extend through a sliding member 40 of ladder-like construction mounted for horizontal movement along cross-members 11, 12, bearings 41 for guiding the member being mounted at intervals along plates 11, 12. The rungs 42 of the ladder-like slide member clear the handles 39 by an amount permitting variation of diameter of the screws of ⅛" and the ladder-like slide, which is urged to the right as seen in Figs. 1 and 2, by tension coil springs 43, 44, is latched in normal position as seen in Fig. 1 by a pawl 45 engaging a stationary stop 46 on the cross frame members 11, 12 pivotally mounted at 47 on a rung of the slide. The pawl keeps the slide in such position, when latched, that the rungs allow only limited movement of the levers 36 such as will accommodate variation in the diameters of the feed screws but will prevent their dropping out in case they become clogged with rubber bands. When it is desired to remove a feed screw, the slide is unlatched and coil springs 43, 44 move the slide to the right, as seen in Figs. 1 and 2 permitting greater movement of levers 36. An upstanding handle 48 fixed to slide 40 permits manipulation of the slide.

For unlatching the pawl 45, a lever 50 is pivotally mounted on a one stringer of the slide 40 and has a pivotal connection 51 with the pawl. The free end of the lever 50 extends through a clearance slot in the cross frame member 11.

A safety gate 60 is pivotally mounted on a rod 61 extending across the apparatus. This gate must be lifted for access to slide 40 and in its lowered position protects the operator from the mechanism just described. A plunger operated switch 62 is connected electrically in the circuit of the motor which drives the apparatus and is mechanicaly located beneath the gate 60 with its plunger contacting the gate and closing its circuit. The arrangement is such that when the gate is lifted to permit release of the latch 45, the motor stops the rotation of the rollers and gears.

The invention permits use of screws 15 having variations in diameter, insures driving of the screws, and permits their removal, while at the same time protecting the operator.

Variations may be made without departing from the scope of the invention as it is defined by the following claims.

I claim:

1. Apparatus for arranging looped articles of the type in which feed screws of coiled wire are cradled between driving rolls, said apparatus comprising pairs of driven rolls mounted on fixed axes, movable spring pressed rolls cooperating with said pairs of rolls for resiliently holding the feed screws thereagainst, means limiting movement of said spring pressed rolls to an extent insufficient to release said feed screws when the apparatus is in use, quick-acting release and return means for shifting said last named means to a position permitting removal of said feed screws by permitting greater movement of said spring pressed rolls.

2. Apparatus as defined by claim 1 including means for driving said spring pressed rolls in any position thereof.

3. Apparatus for arranging looped articles of the type in which feed screws of coiled wire are cradled between driving rolls, said apparatus comprising pairs of driven rolls mounted on fixed axes, a lever pivotally mounted and rotatably supporting a third roll, all of said rolls being driven, spring means for urging said third roller toward the bight of a pair of said fixed rolls, a slide member having a stop for limiting movement in said direction, a latch mounted to hold said slide member in a position limiting movement of said lever to an extent insufficient to release said feed screws, and means for releasing said latch to permit replacement of said feed screws.

4. Apparatus for arranging looped articles of the type in which feed screws of coiled wire are cradled between driving rolls, said apparatus comprising pairs of driven rolls mounted on fixed axes, a lever pivotally mounted and rotatably supporting a third roll, all of said rolls being driven, spring means for urging said third roller towards the bight of a pair of said fixed rolls, a slide member having a stop for limiting movement in said direction, a latch mounted to hold said slide member in a position limiting movement of said lever to an extent insufficient to release said feed screws, and means for releasing said latch to permit replacement of said feed screws, and means preventing release of said latch when said rolls are being driven.

5. Apparatus for supporting and rotating a coil type article conveyor, said apparatus comprising three driven rolls contacting said conveyor about its perimeter, one of said rolls being movable toward and away from the other rolls to release said conveyor, means urging said movable roll toward said other rolls, and means limiting movement of said movable roll away from said other rolls, said last named limiting means comprising a movable member and a latch holding said movable member in a position to limit movement of said movable roll, and quick-acting return means for shifting said movable member to a position permitting removal of said conveyor upon release of said latch.

HANS G. HAGER.

REFERENCES CITED

The following references are of record in the file of this patent:

UNITED STATES PATENTS

| Number | Name | Date |
| --- | --- | --- |
| 1,578,393 | Cadden et al. | Mar. 30, 1926 |
| 1,713,678 | Seibert | May 21, 1929 |